United States Patent [19]

Scheetz et al.

[11] 4,281,070

[45] Jul. 28, 1981

[54] MELT PROCESSABLE UHMWPE

[75] Inventors: Howard A. Scheetz, Lancaster; Richard C. Gilles, Sinking Spring, both of Pa.

[73] Assignee: The Polymer Corporation, Reading, Pa.

[21] Appl. No.: 110,205

[22] Filed: Jan. 7, 1980

[51] Int. Cl.³ .............................................. C08K 3/36
[52] U.S. Cl. ....................................... 525/1; 260/42.46
[58] Field of Search .......................... 260/42.46; 525/1

[56] References Cited

U.S. PATENT DOCUMENTS 3,929,939  12/1975  Salyer et al. ....................... 260/42.46

Primary Examiner—Stanford M. Levin
Attorney, Agent, or Firm—Richard O. Church

[57] ABSTRACT

Ultrahigh molecular weight polyethylene molding powders with improved melt characteristics are disclosed that can be processed with conventional melt forming equipment such as screw extruders and injection molding machines. The molding powders are comprised of from 70 to 95 weight percent ultrahigh molecular weight polyethylene, from 5 to 30 weight percent of an intermediate molecular weight polyethylene and from 0.1 to 10 percent of a finely divided nucleating agent.

1 Claim, No Drawings

MELT PROCESSABLE UHMWPE

BACKGROUND OF THE INVENTION

1. Field of the Invention

This invention relates to ultrahigh molecular weight polyethylene and more particularly to ultrahigh molecular weight polyethylene molding powders having improved melt processing characteristics.

2. Description of the Prior Art

Ultrahigh molecular weight polyethylene (UHMWPE) may be defined as polyethylene having a molecular weight in excess of about a million and commonly in excess of 2 or 3 million. These extremely high molecular weight polyethylenes provide a number of technically important properties including notched impact strength, energy absorption capacity at high loading rates, tensile impact strength at elevated temperature, resistance to stress cracking and extremely low embittlement temperatures. Necessarily at these high molecular weights, the polyethylene has a high solution viscosity and pronounced viscoelastic characteristics in the melt. In fact, above its crystalline melting point, UHMWPE is not a liquid but behaves much like a rubbery solid. The very high molding pressures needed to form shapes from UHMWPE practically limits the equipment upon which it can be processed to ram extruders and compression molding machines.

In an attempt to make UHMWPE processable at lower temperatures an intermediate molecular weight (e.g. 400,000 to 600,000) polyethylene that behaves more like a liquid above its melting point has been mixed with UHMWPE. When the mixture is heated to above the melting point of the intermediate molecular weight polyethylene, a pumpable slurry-like material results in which the ultrahigh molecular weight polyethylene molding powders are suspended in the liquid phase of the intermediate weight polyethylene. The mixture is processable in conventional injection molding machines and screws extruders in making UHMWPE shapes.

The use of an intermediate molecular weight polyethylene to improve the melt processability of UHMWPE is not without an attendant disadvantage since effective amounts of intermediate molecular weight polyethylene causes a marked decrease in some of the most desirable properties of the UHMWPE, such as impact strength and abrasion resistance. For this reason, the addition of intermediate molecular weight polyethylenes to UHMWPE does not, in itself, present a practical way to improve the melt processability of UHMWPE.

OBJECTS OF THE INVENTION

Accordingly, it is an object of this invention to improve the melt processability of UHMWPE molding powders.

Another object of this invention is to modify the melt characteristics of UHMWPE molding powders so that they can be processed in standard screw extruders and injection molding machines.

Another object of this invention is to facilitate the melt formation of shapes and parts from UHMWPE without unduly sacrificing desirable physical properties of UHMWPE.

Briefly, these and other objects of this invention are achieved by mixing 5 to 30 weight percent of an intermediate molecular weight polyethylene with UHMWPE and a small amount (less than about 1 weight percent) of a polyethylene nucleating agent. It has been discovered that the addition of the intermediate weight polyethylene does not seriously compromise the physical properties of the UHMWPE when the nucleating agent is included in the formula. It is believed that the nucleating agent increases crystallinity which effectively offsets the reduction in physical properties that would otherwise be observed. A secondary benefit obtained is that somewhat lower temperatures, shorter processing times above the melt, and reduced shear forces are needed to process UHMWPE that has been blended with an intermediate molecular weight polyethylene. The extremely long polymer chains of UHMWPE are somewhat fragile and are susceptible to being torn by shear forces or degraded by heat. The use of less severe conditions during melt formation helps preserve the molecular weight of the starting molding powders.

A preferred nucleating agent for use in the practice of this invention is pyrogenic silica which may be characterized as extremely small particles of silica having huge surface areas. These can be obtained, for example, under the trade name Aerosil from Degussa and from Cabot under its trade name Cab-O-Sil. These pyrogenic silicas are generally described as having particle sizes in the range of from 5 to 50 nanometers and surface areas in a range of from about 100 to 400 square meters per gram.

EXAMPLES I to III

Three sets of molding powders were prepared having the following composition by weight.

| Example | UHMWPE M.W. $3.5 \times 10^6$ | High Density Polyethylene M.W. $0.6 \times 10^6$ | Pyrogenic Silica |
| --- | --- | --- | --- |
| I | 100% | | |
| II | | 99.7% | 0.3% |
| III | 79.8% | 19.9% | 0.3% |

The molding powders prepared in Example II and III were melt blended and specimens for testing were made by injection molding. Test specimens for Example I were prepared by extrusion. The observed properties of the specimens made from these molding powders are tabularized below.

| Example | Limiting PV | Wt. Loss mg | K Factor $\times 10^{-10}$ | Shear Strength PSI | Tensile PSI | Elongation % | Abrasion Index |
| --- | --- | --- | --- | --- | --- | --- | --- |
| I | 20,000 | 135 | 348 | 3,500 | 5,000 | 200–400 | 15 |
| II | 20,000 | 105 | 130 | 4,130 | 1,920 | 54 | 86 |
| III | 22,500 | 10 | 74 | 3,800 | 3,350 | 72 | 20 |

In the above examples the wear factor K was determined in the test procedure that is commonly used in the plastic bearing art. In this test a ½ inch diameter journal bearing is machined from the sample to be tested into which a steel shaft is inserted for rotation. The shaft is rotated under loads measured in pounds per square inch and at velocities measured in feet per minute and the wear depth of the journal bearing is measured in inches after 200 hours. K is then calculated by substituting the recorded values in the following equation:

$$K = h/PVT$$

in which h is the war, P is the pressure, V is the velocity, and T is the time. This results in a K number having units of in.$^3$min./ft.lb.hr. and, for convenience, is expressed in values of $10^{-10}$.

The limiting PV value given in the examples is an arbitrary number which indicates the PV loading under steady state conditions at which the bearing temperature initiated excessive deformation.

The abrasion index was determined by making a $3'' \times 1'' \times \frac{1}{4}''$ coupon which was mounted on a shaft for rotation. The coupon was immersed in 50/50 sand-water slurry and rotated at 1750 rpm for 7 hours. Carbon steel was used as the comparison and was assigned an abrasion rating of 100 based on the volume of material lost during the test.

In the above Examples it is believed significant that the K wear factor of the molding powder of this invention was significantly better than the unmodified polyethylenes and, at the same time, there was little increase in the abrasion resistance value of the molding powder of this invention over that of the UHMWPE, which suggests that a synergistic effect is being obtained.

EXAMPLE IV

A molding powder made in according with Example III was used to injection mold parts approximately $\frac{1}{4}$ inch thick, $1\frac{1}{4}$ inch wide and 5 inches long with an array of holes passing through the $1\frac{1}{4}$ inch dimension. The mold cavity for this part was fed through two very small fan gates, a critical test for UHMWPE molding compounds. Parts were successfully molded in this manner even though the injection molding machine (VanDorn) had a low torque hydraulic feed mechanism which is generally not considered suitable for injection molding very viscous materials. However, no feeding, filling, injecting or molding problems were detected.

I claim:

1. An ultrahigh molecular weight polyethylene molding composition comprised of 70 to 95 percent by weight ultrahigh molecular weight polyethylene, from 5 to 30 percent by weight of an intermediate molecular weight polyethylene having a molecular weight in a range from about 400,000 to 600,000 and from 0.1 to 10 percent by weight of a pyrogenic silica nucleating agent.

* * * * *